(12) United States Patent
Chan et al.

(10) Patent No.: US 10,931,091 B2
(45) Date of Patent: Feb. 23, 2021

(54) MISALIGNED DEADEND CLAMP

(71) Applicant: Hubbell Incorporated, Shelton, CT (US)

(72) Inventors: Peter Chan, Toronto (CA); David Boudreau, Manchester, NH (US); Ben Crutcher, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/422,158

(22) Filed: May 24, 2019

(65) Prior Publication Data

US 2019/0363528 A1 Nov. 28, 2019

Related U.S. Application Data

(60) Provisional application No. 62/676,552, filed on May 25, 2018.

(51) Int. Cl.
| | |
|---|---|
| *H02G 7/05* | (2006.01) |
| *H01R 13/58* | (2006.01) |
| *H02G 15/18* | (2006.01) |
| *H01R 4/62* | (2006.01) |

(52) U.S. Cl.
CPC ............ *H02G 7/056* (2013.01); *H01R 4/62* (2013.01); *H01R 13/5833* (2013.01); *H02G 15/18* (2013.01)

(58) Field of Classification Search
CPC ...... H02G 7/056; H02G 15/18; H02G 15/007; H02G 15/02; H02G 15/046; H02G 15/08; H01R 4/62; H01R 4/20; H01R 11/28; H01R 11/11; H01R 11/12; H01R 13/5833; H01R 13/5837
See application file for complete search history.

(56) References Cited

U.S. PATENT DOCUMENTS

| | | | |
|---|---|---|---|
| 2,901,725 A | 8/1959 | Schuyler | |
| 3,034,094 A | 5/1962 | Watson | |
| 3,976,385 A | 8/1976 | Klopfer | |
| 6,805,596 B2 * | 10/2004 | Quesnel | H01R 11/09 174/840 |
| 7,311,553 B2 * | 12/2007 | Tamm | H01R 4/20 439/584 |
| 7,342,175 B2 * | 3/2008 | De France | H01R 4/5025 174/84 R |
| 7,348,489 B2 * | 3/2008 | Chadbourne | H01R 4/62 174/74 R |
| 7,385,138 B2 * | 6/2008 | De France | H01R 4/5025 174/84 R |

(Continued)

OTHER PUBLICATIONS

PCT/US2019/033938 International Search Report and Written Opinion dated Aug. 8, 2019 (19 pages).

*Primary Examiner* — Edwin A. Leon
*Assistant Examiner* — Matthew T Dzierzynski
(74) *Attorney, Agent, or Firm* — Michael Best & Friedrich, LLP

(57) ABSTRACT

An electrical connector assembly configured to increase a mechanical hold on a core. The electrical connector assembly includes a connector member, a plurality of housing segments forming a collet having a tubular shape, and a sleeve having a tubular shape configured to slidably encase the outer surfaces of the plurality of housing segments in the collet.

26 Claims, 6 Drawing Sheets

(56) References Cited

U.S. PATENT DOCUMENTS

| | | | | |
|---|---|---|---|---|
| 7,407,411 | B2* | 8/2008 | Byrne | H01R 13/5804 |
| | | | | 174/74 R |
| 7,575,485 | B2* | 8/2009 | Waltz | H01R 4/20 |
| | | | | 174/74 R |
| 7,858,882 | B2* | 12/2010 | DeFrance | H01R 11/11 |
| | | | | 174/79 |
| 7,882,629 | B2* | 2/2011 | Chadbourne | H01R 4/62 |
| | | | | 174/79 |
| 8,167,665 | B2* | 5/2012 | De France | H01R 4/20 |
| | | | | 439/783 |
| 8,674,230 | B2* | 3/2014 | Hoxha | H01R 13/5837 |
| | | | | 174/135 |
| 8,777,679 | B2* | 7/2014 | De France | H01R 4/20 |
| | | | | 439/879 |
| 8,895,856 | B2* | 11/2014 | McCullough | F16G 11/02 |
| | | | | 174/75 R |
| 9,397,461 | B2* | 7/2016 | De France | H01R 43/048 |
| 9,748,670 | B1* | 8/2017 | Quesnel | H01R 4/203 |
| 10,128,582 | B2* | 11/2018 | Diop | H01R 4/4872 |
| 2003/0194916 | A1 | 10/2003 | Quesnel et al. | |
| 2004/0029455 | A1* | 2/2004 | Johnson | H01R 4/60 |
| | | | | 439/796 |
| 2010/0190389 | A1 | 7/2010 | DeFrance | |
| 2013/0068501 | A1 | 3/2013 | Hoxha | |
| 2015/0075837 | A1* | 3/2015 | Welborn | H01R 43/20 |
| | | | | 174/90 |
| 2019/0386410 | A1* | 12/2019 | Olszewski | H01R 11/14 |

* cited by examiner

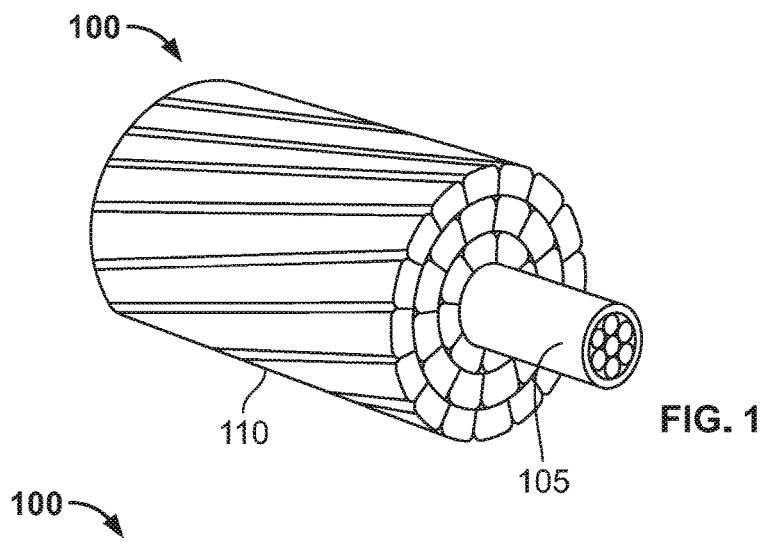
FIG. 1
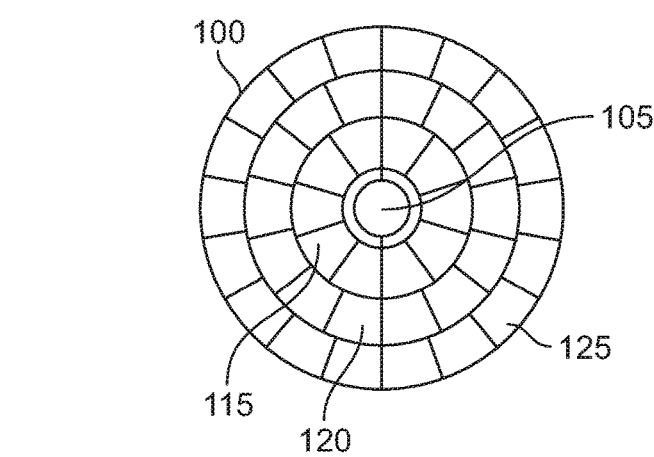
FIG. 2
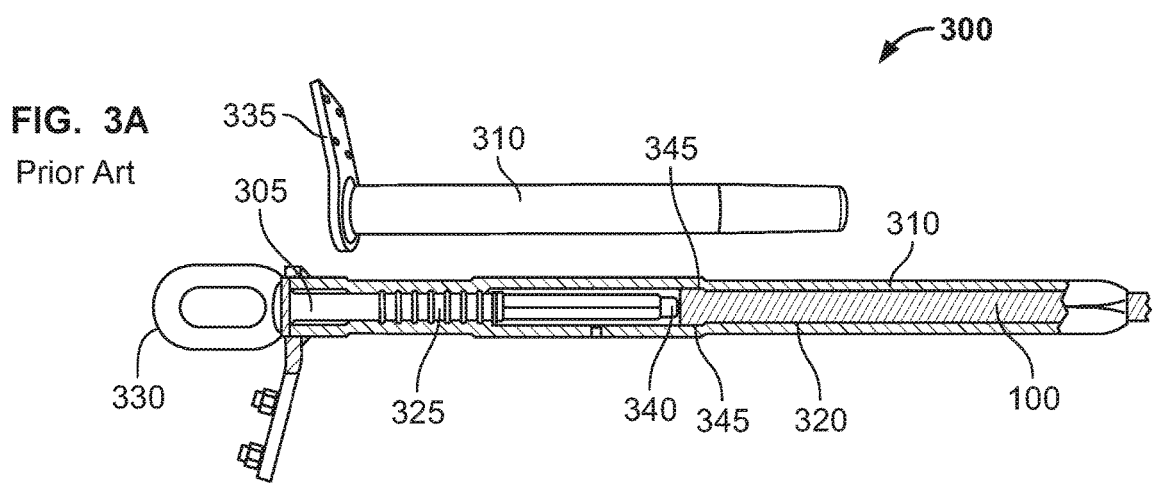
FIG. 3A
Prior Art
FIG. 3B
Prior Art

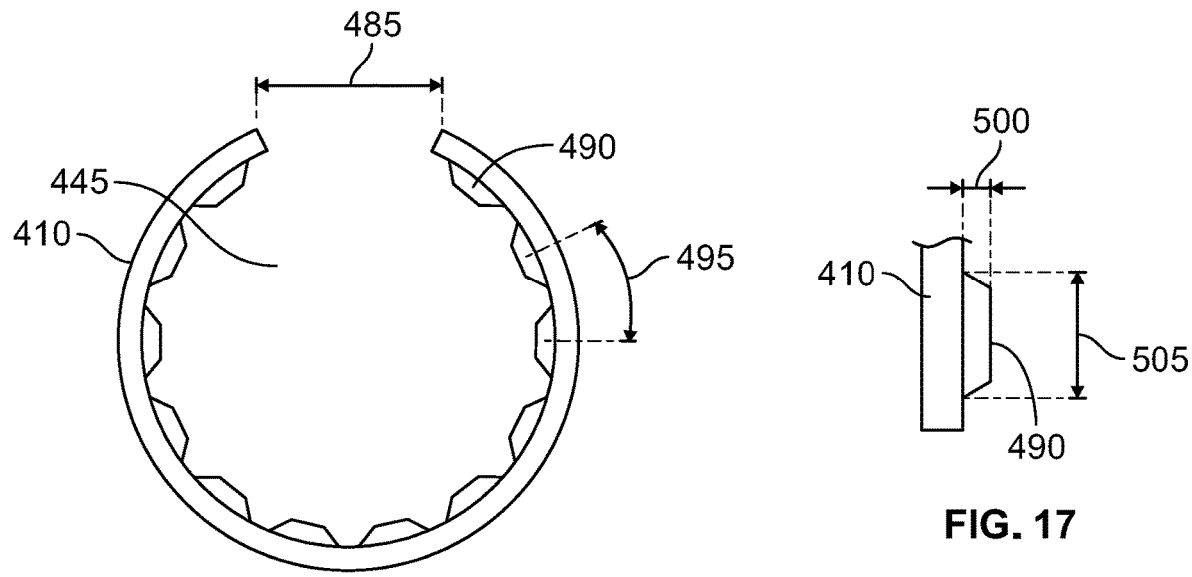
FIG. 16
FIG. 17
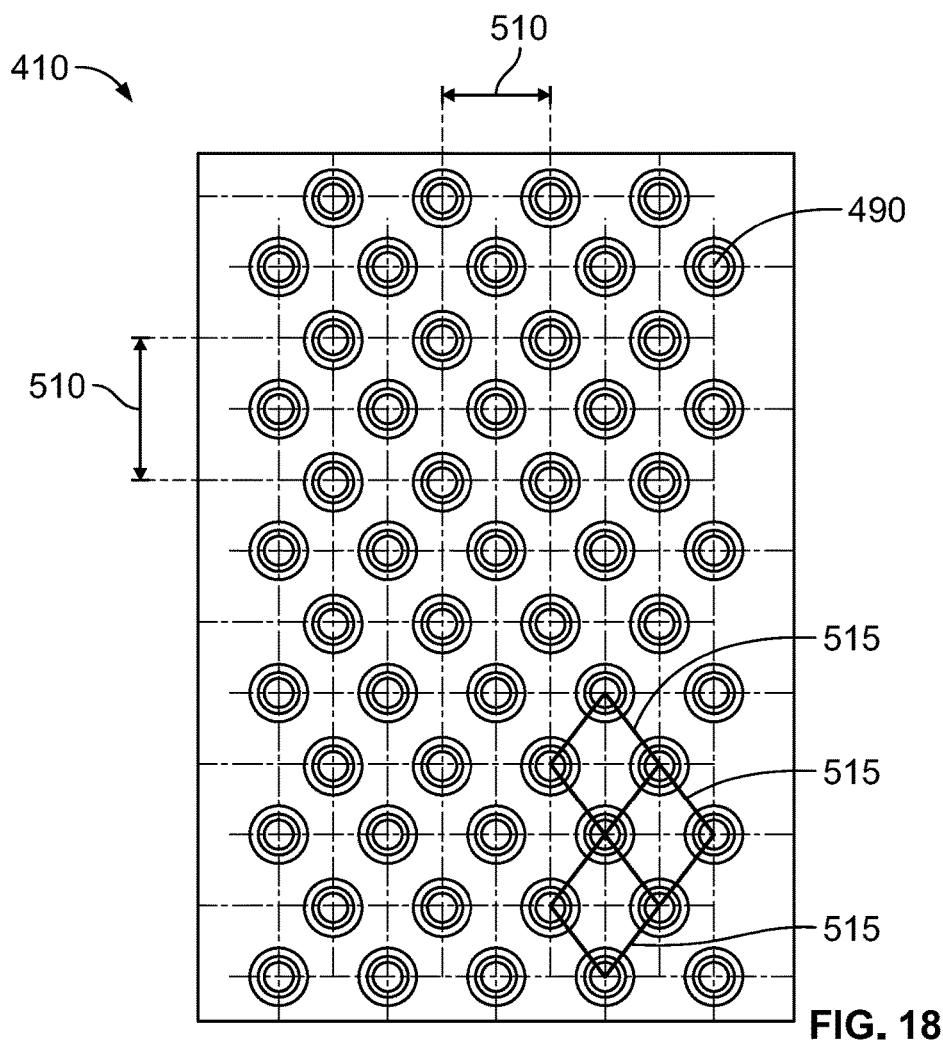
FIG. 18

MISALIGNED DEADEND CLAMP

RELATED APPLICATIONS

This application claims priority to U.S. Provisional Patent Application No. 62/676,552, filed on May 25, 2018, the entire contents of which are incorporated herein by reference.

FIELD

Embodiments relate to an electrical connector assembly configuration adapted to increase a mechanical hold on composite cores or other cores used in transmission of power.

SUMMARY

Aluminum Conductor Composite Core (ACCC) is a type of high-temperature, low-sag overhead power line conductor used in the transmission of power. ACCC cables incorporate a light-weight advanced composite core, which replaces the steel wire core of traditional energy cables. Aluminum conductor wires are wrapped around the light-weight composite core in a manner similar to traditional energy cables. The composite core's lighter weight, smaller size, and enhanced strength and other performance advantages over a traditional steel core allows an ACCC cable to double the current carrying capacity over existing transmission and distribution cables and virtually eliminate high-temperature sag.

However, there is a problem when attempting to connect conventional electrical connectors to an ACCC cable. The ACCC cable may be inserted into the electrical connector assembly and radially compressed via bolting with bolts or crimping with a compression die to produce a mechanical connection between the electrical connector assembly and the ACCC cable. This requires that the ACCC cable be able to withstand a certain level of compression force from the electrical connector assembly and the bolting/crimping process. However, although the composite core provides an excellent tensile strength (for example, approximately 21 tons), the ACCC cable may only withstand a small compression force since its compression strength is much lower than its tensile strength. As a result, a traditional compression electrical connector (for example, a deadend clamp) that transmits the tension on a suspended cable to a supporting structure could crush or damage the composite core. Lessening the compression force on the core would prevent a strong mechanical attachment between the core and other connecting transmission elements (for example, transmission towers or utility poles), thus potentially causing disengagement of the ACCC cable.

In this regard, there is a need for an electrical connector (for example, a deadend clamp) which can increase the mechanical hold on a core without crushing or significantly damaging the core. In the present application, the electrical connector forms a strong tensile connection between the core and the connector, thus allowing the core/connector assembly to be suspended by attachment to transmission towers.

One embodiment discloses an electrical connector assembly configured to increase a mechanical hold on a core. The electrical connector assembly includes a connector member and a plurality of housing segments forming a collet having a tubular shape. Each of the plurality of housing segments have an inner surface and an outer surface, wherein the inner surface of the plurality of housing segments form an inner channel of the collet. The assembly further includes a sleeve having a tubular shape configured to slidably encase the outer surfaces of the plurality of housing segments in the collet, wherein the inner channel is configured to receive the core. Wherein the inner surfaces of the plurality of housing segments are misaligned from each other such that their combination in the collet form segments of discontinuous offset in the inner channel.

Another embodiment discloses an electrical connector assembly configured to increase a mechanical hold on a core. The electrical connector assembly includes a connector member and a plurality of housing segments forming a collet having a tubular shape. Each of the plurality of housing segments have an inner surface and an outer surface, wherein the inner surfaces of the plurality of housing segments form an inner channel of the collet. The assembly further includes a sleeve having a tubular shape configured to slidably encase the outer surfaces of the plurality of housing segments in the collet, wherein the inner channel is configured to receive the core. Wherein the inner surfaces of the plurality of housing segments are aligned and angled from each other such that their combination in the collet form a continuous wave in the inner channel.

Yet another embodiment discloses an electrical connector assembly configured to increase a mechanical hold on a core. The electrical connector assembly includes a connector member and three housing segments forming a collet having a tubular shape. Each of the three housing segments having an inner surface and an outer surface, wherein the inner surface of each housing segment includes a recessed channel, and wherein the recessed channels of the three housing segments form an inner channel of the collet. The assembly further includes a sleeve having a tubular shape configured to slidably encase the outer surfaces of the three housing segments in the collet, wherein the inner channel is configured to receive the core. Wherein the recessed channel of each housing segment is different and complementary to each other such that the combination of the recessed channels in the three housing segments form a spiral helix in the inner channel.

Another embodiment discloses an electrical connector assembly configured to increase a mechanical hold on a core. The electrical connector assembly includes a connector member and a plurality of housing segments forming a collet having a tubular shape. Each of the plurality of housing segments having an inner surface and an outer surface, wherein the inner surfaces of the plurality of housing segments form an inner channel of the collet. The assembly further includes a sleeve having a tubular shape configured to slidably encase the outer surfaces of the plurality of housing segments in the collet, wherein the inner channel is configured to receive the core. Wherein the inner surface of at least one of the plurality of housing segments includes a plurality of dimples.

Other aspects of the application will become apparent by consideration of the detailed description and accompanying drawings.

BRIEF DESCRIPTION OF THE DRAWINGS

The aspects and features of various exemplary embodiments will be more apparent from the description of those exemplary embodiments taken with reference to the accompanying drawings, in which:

FIG. 1 is a perspective view of an end of an Aluminum Conductor Composite Core (ACCC) cable according to some embodiments;

FIG. 2 is a cross sectional view of the ACCC cable shown in FIG. 1 according to some embodiments;

FIGS. 3A and 3B are views of a conventional connector and cable assembly according to some embodiments;

FIG. 16 shows a cross-sectional view of the one-piece dimple collet shown in FIG. 15 according to some embodiments;

FIG. 17 shows a dimple in the one-piece dimple collet shown in FIGS. 15-16 according to some embodiments; and FIG. 18 shows a two-dimensional view of the one-piece dimple collet shown in FIG. 15 according to some embodiments.

DETAILED DESCRIPTION OF EXEMPLARY EMBODIMENTS

Figure 4:
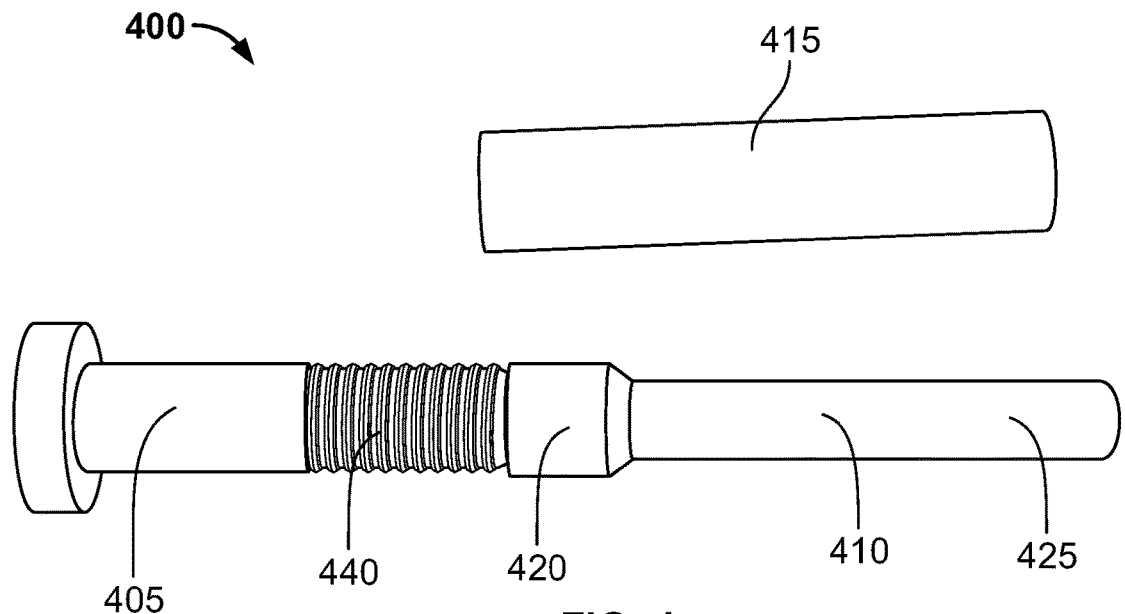
FIG. 4 shows a connector and cable assembly with the sleeve removed according to one embodiment.

Before any embodiments of the application are explained in detail, it is to be understood that the application is not limited to the details of construction and the arrangement of components set forth in the following description or illustrated in the following drawings. The application is capable of other embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

As described herein, terms such as "front," "rear," "side," "top," "bottom," "above," "below," "upwardly," and "downwardly" are intended to facilitate the description of the electrical receptacle of the application, and are not intended to limit the structure of the application to any particular position or orientation.

Exemplary embodiments of devices consistent with the present application include one or more of the novel mechanical and/or electrical features described in detail below. Such features may include a connector member, a plurality of housing segments forming a collet having a tubular shape, and a sleeve having a tubular shape configured to slidably encase the collet. In exemplary embodiments of the present application, various features of the plurality of housing segments will be described. The novel mechanical and/or electrical features detailed herein efficiently increase the mechanical hold of the collet on a composite core used in transmission such that a good tensile connection is provided without significant damaging the core. Although the application will be described with reference to the exemplary embodiments shown in the figures, it should be understood that the application can be embodied in many alternate forms of embodiments. In addition, any suitable size, shape, or type of elements or materials could be used.

Referring to FIG. 1, there is shown a perspective view of an end of an Aluminum Conductor Composite Core (ACCC) cable 100. The ACCC cable 100 incorporates a light-weight advanced composite core 105 surrounded by conductor wires 110. The composite core 105 may be composed of carbon composite, glass fiber, or other materials suitable for transmission of mechanical force. The conductor wires 110 are generally formed of aluminum, although other materials may be used to achieve the same results. Referring to FIG. 2, the wires 110 include inner strands 115 surrounded by middle strands 120 surrounded by outer strands 125. In other embodiments, various layers of strands may wind around the composite core 105 to produce different transmission parameters. The ACCC cable 100 is lighter and has a greater current carrying capacity compared to traditional cables with steel cores. The use of ACCC cable 100 allows the current carrying capacity to double over existing transmission and distribution cables while virtually eliminating high-temperature sag, thus increasing system reliability.

Referring to FIGS. 3A and 3B, a conventional cable and connector assembly 300 is shown. The assembly 300 includes a connector member 305, a collet housing or outer sleeve 310, and the conductor cable 100. To form the necessary mechanical connection, the conductor cable 100 is inserted into a cavity 320 formed by the collet housing 310. The collet housing 310 is mechanically coupled to one end of the connector member 305 via a threaded or raised rib portion 325 such that a contact end 340 of the connector member 305 is abutting the inserted conductor cable 100. The other end of the connector member 305 may be configured as a dead end connector including an eyebolt 330 adapted to couple to a transmission tower (not shown or enumerated). The collet housing 310 receives a compression force (for example, a crimping force) applied over the raised rib portion 325, thereby reinforcing the mechanical connection between the collet housing 310 and the connector member 305. The inner wall of the cavity 320 applies a radial compression force on the conductor cable 100, which provides the mechanical hold on the cable 100. Transition area 345 between the inner wall of the cavity 320 and the conductor cable 100 assist in preventing the cable 100 from pulling out and disengaging from the collet housing 310. In some embodiments, the collet housing or outer sleeve 310 may include a connection plate 335 configured to electrically connect to another connector member in another assembly. The connection plate 335 need not necessarily be provided in all embodiments.

In the conventional cable and connector assembly 300 of FIG. 3, the radial compression force required from the cavity 320 to maintain the mechanical hold on the cable 100 may exceed the compression strength of the cable 100. This may damage the cable 100 and/or decrease its transmission efficiency. The electrical connector design of the present application aims to increase the mechanical hold on the cable 100 without damage from excessive compression.

Figure 5:
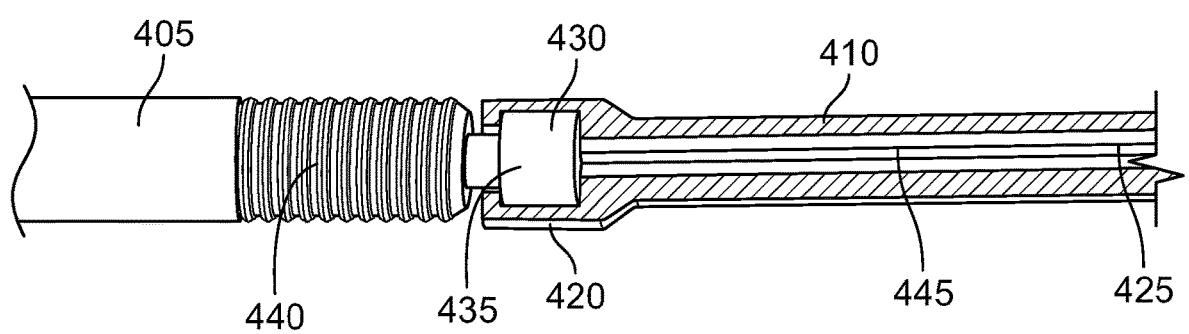
FIG. 5 shows a half-formed collet of FIG. 4 coupled to the connector member according to some embodiments.

Referring to FIG. 4, a cable and connector assembly 400 of the present application includes a connector member 405, a tubular shaped collet 410, a tubular shaped sleeve 415, and a core 105 (not shown). The collet 410 includes a first end 420 and a second end 425 opposite the first end 420. Referring to FIG. 5, the first end 420 of the collet 410 includes a cavity 430 configured to receive a contact end 435 located at one end of the connector member 405. The collet 410 includes an inner channel 445 extending the length of the collet 410 from the second end 425 through to the first end 420. The core 105 (not shown) is inserted into the inner channel 445 to form a mechanical connection with the contact end 435 of the connector member 405.

Figure 6:
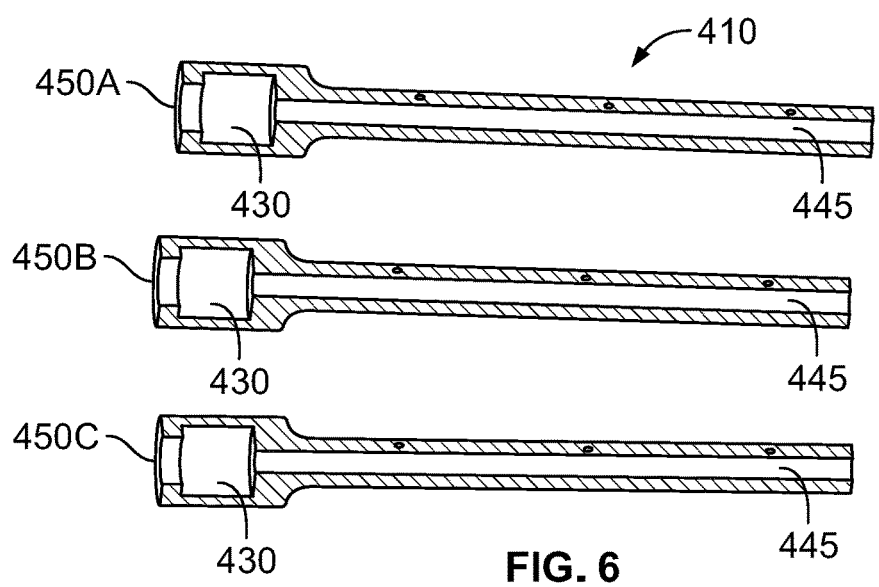
FIG. 6 shows a plurality of housing segments forming the collet according to one embodiment.
Figure 7:
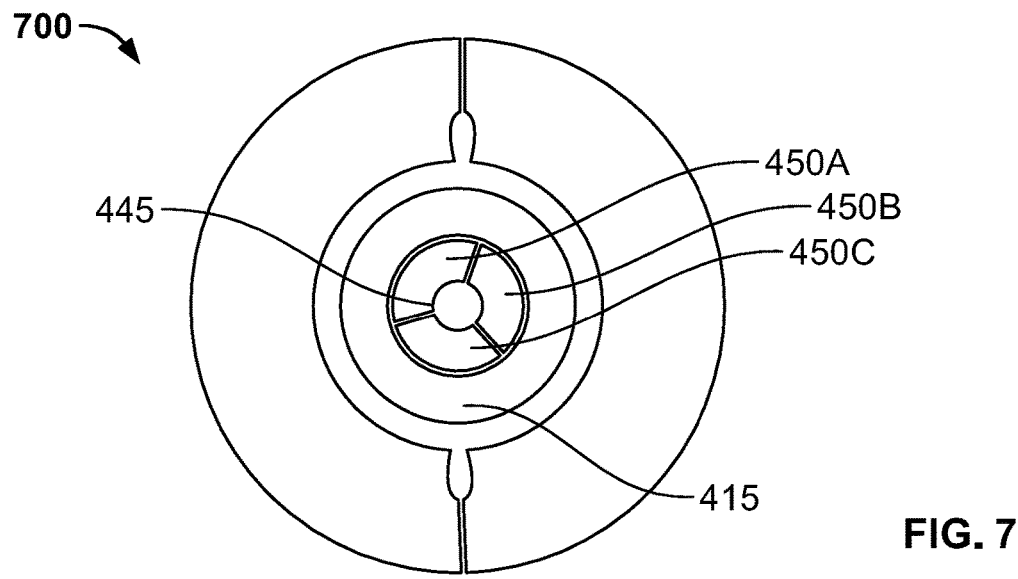
FIG. 7 shows an end view of the housing segments of FIG. 6 within a compression die during the crimping process according to some embodiments.
Figure 8:
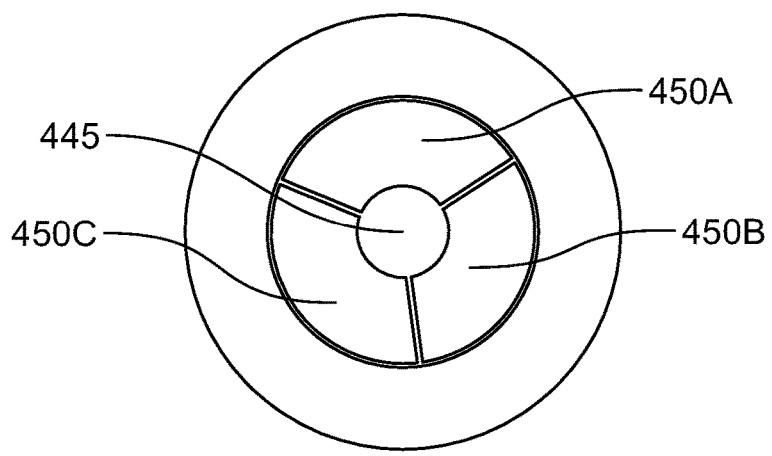
FIG. 8 shows an end view of the housing segments after the crimping process shown in FIG. 7 according to some embodiments.

In one embodiment shown in FIG. 6, the inner channel 445 of the collet 410 may be formed by three housing segments 450A-C. Each housing segment 450A-C includes a portion of the cavity 430 and a portion of the inner channel 445 such that when assembled, the tubular collet 410 of FIG. 4 is formed. The sleeve 415 slidably encases the collet 410 and a ribbed portion 440 (see FIG. 4) of the connector member 405. A crimping process, as shown in FIGS. 7-8, is performed on the sleeve 415, which receives a radial compression force applied by a compression ("crimping") die 700. The compression force is transferred from the sleeve 415 to the enclosed housing segments 450A-C, thereby closing any gaps between the housing segments 450A-C and forming a mechanical connection between the collet 410 and the inserted core 105 (not shown).

A shape and/or alignment configuration of the inner channel 445 may reinforce the mechanical connection between the collet 410 and the core 105 (not shown) by providing an additional friction force on the core 105 (not shown). This friction force opposes the tension force acting to pull out the inserted core 105 (not shown) from the collet 410 in a suspended cable 100, thus allowing the required compression force exerted by the collet 410 on the core 105 (not shown) to decrease while maintaining a sufficient mechanical hold on the core 105 (not shown). Since the core 105 (not shown) has a much higher tensile strength than compression strength, compression damage to the core 105 (not shown) may be reduced or virtually eliminated using various shape and/or alignment configurations of the inner channel 445, as described further in the following figures. It should be understood by those skilled in the art that the shape and/or alignment configurations disclosed herein may be implemented to enhance the mechanical hold and compression on a variety of connector assemblies and need not necessarily be implemented in combination with a specific connector assembly disclosed in the present application.

Figure 9:
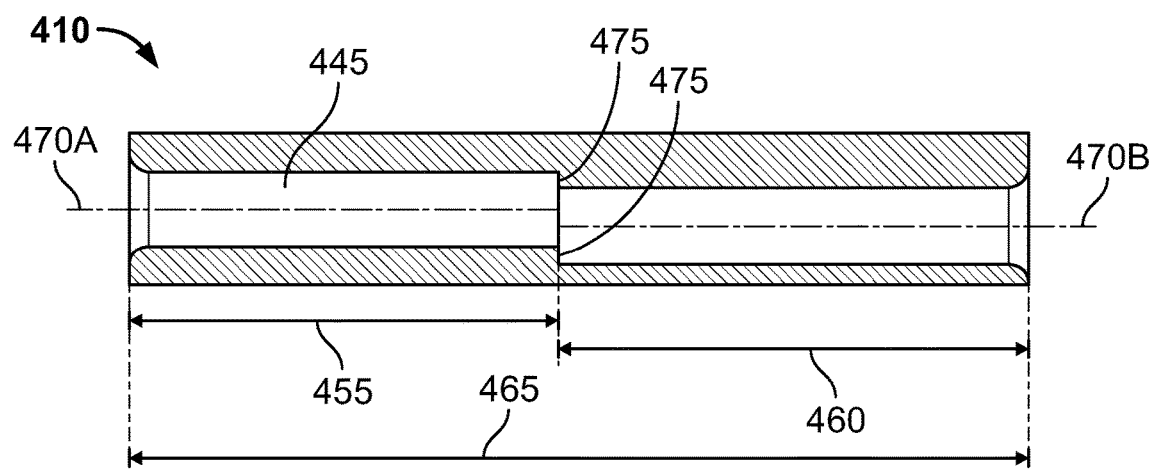
FIG. 9 shows a cross-sectional view of a collet inner channel according to one embodiment.

Referring to FIG. 9, a misaligned inner channel configuration of a collet 410 according to one embodiment is shown. The entire collet 465 (for example, having a length of approximately two inches) may be divided into a first section 455 and a second section 460. The length ratio of the first section 455 to the second section 460 may vary in different embodiments and not exhaustively disclosed herein. Each collet section 455, 460 respectively includes a separate and distinct midline 470A, 470B that divides the corresponding section 455, 460 symmetrically across a longitudinal direction of the collet 410. In the embodiment of FIG. 9, the first section 455 is misaligned from the second section 460 such that midline 470A is discontinuous and offset from midline 470B to create vertical inner edges 475 along the interior surface of the inner channel 445. The inner edges 475 provide a translational friction force against an inserted core 105 (not shown) that opposes the tension force acting to disengage the suspended core 105 (not shown) from the collet 410.

Figure 10:
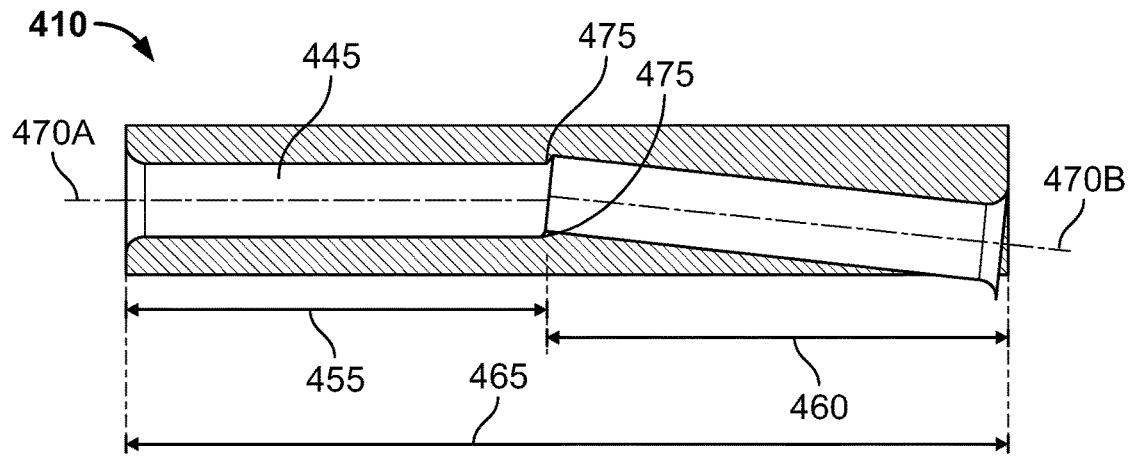
FIG. 10 shows a cross-sectional view of a collet inner channel according to another embodiment.

Referring to FIG. 10, an angled inner channel configuration of a collet 410 according to another embodiment is shown. In this embodiment, the first section 455 is aligned and angled from the second section 460 such that midline 470A is continuous and angled from midline 470B. The angle formed between midline 470A and midline 470B may vary in different embodiments and not exhaustively disclosed herein. Inner edges 475 are smooth in this embodiment (for example, no inner edges 475 are present in the inner channel 445). The angled surfaces of the first section 455 and the second section 460 provide the translational friction force against an inserted core 105 (not shown) that oppose the tension force acting to disengage the suspended core 105 (not shown) from the collet 410. It would be appreciated by those skilled in the art that the first and second sections 455, 460 may be misaligned and/or angled from each other by various amounts and/or degrees, the possibilities of which are not exhaustively described herein. It would also be understood by those skilled in the art that the entire collet 465 may be divided into a number of sections not detailed herein to achieve essentially the same results, and therefore do not deviate from the teachings of the present application.

Figure 11:
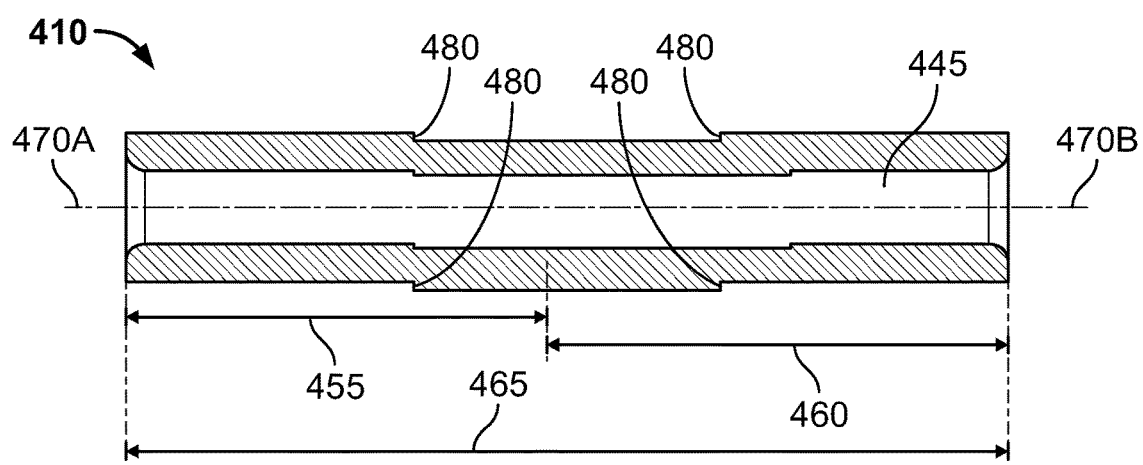
FIG. 11 shows a cross-sectional view of a collet exterior surface according to the embodiment shown in FIG. 9.
Figure 12:
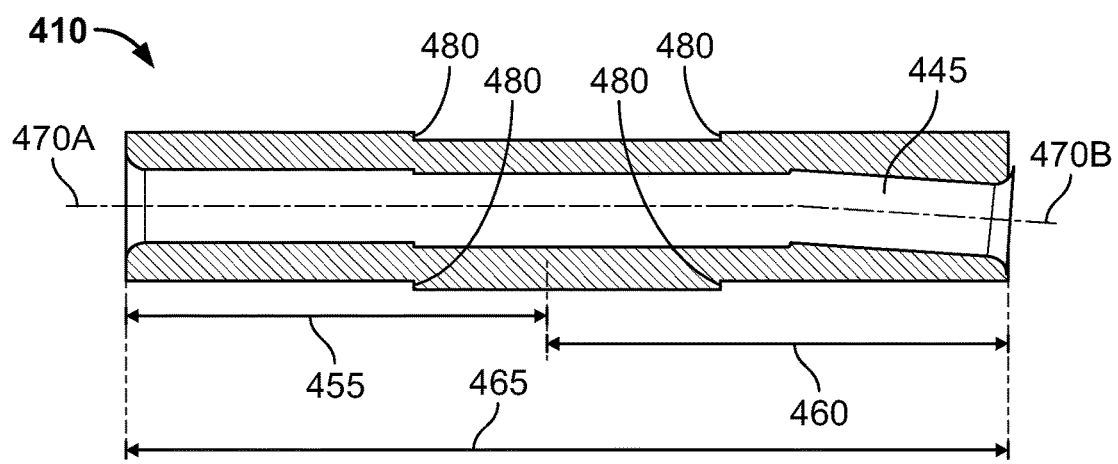
FIG. 12 shows a cross-sectional view of a collet exterior surface according to the embodiment shown in FIG. 10.

Similar to the inner edges 475, outer edges 480 (see FIGS. 11-12) may be provided to the exterior surface of the collet 410 to provide a likewise translational friction force between the collet 410 and the sleeve 415 that slidably encases the collet 410. This translational force, in addition to the crimping process of FIGS. 7-8, reinforces the mechanical coupling of the collet 410 and the sleeve 415. The sleeve 415, which is further coupled to the connector member 405, acts as a coupling medium, allowing the transmission of power from the core 105 (not shown) inserted in the collet 410, through the connector member 405 via the contact end 435, and to the connected transmission tower (not shown or enumerated).

Figure 13:
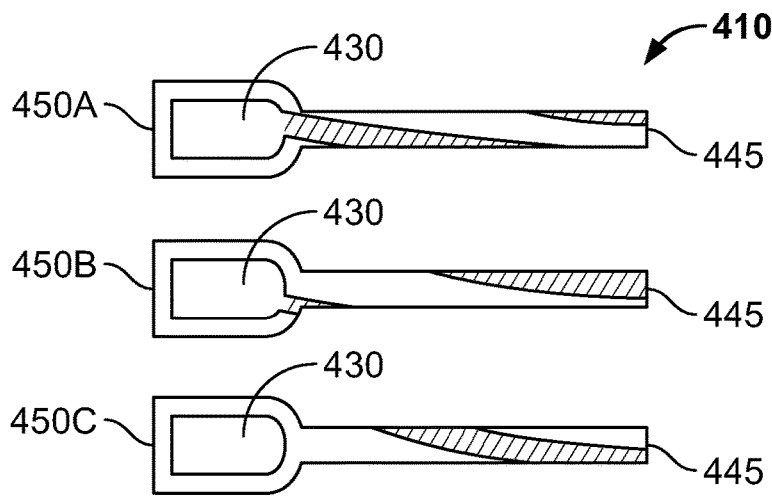
FIG. 13 shows a cross-sectional view of a three-piece spiral/helix inner channel according to another embodiment.

Referring to FIG. 13, a spiral/helix inner channel configuration of a collet 410 according to another embodiment is shown. In this embodiment, each of the three housing segments 450A-C includes a portion of the inner channel 445 that is of a different and complementary shape to each other. When assembled, the three housing segments 450A-C form the inner channel 445 configured as a spiral/helix in three-dimensional space. The core 105 (not shown) inserted into the spiral/helix inner channel is forced to twist and turn in a cork-screw manner following the spiral/helix shape of the inner channel 445. This provides an additional twisting force on that core that counters the tension force acting to disengage the suspended core 105 (not shown) from the collet 410.

Figure 14:
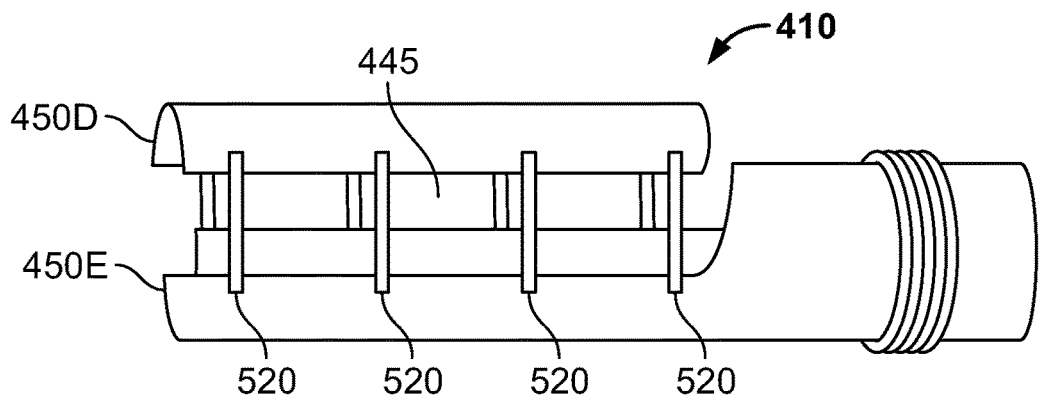
FIG. 14 shows an exploded view of a two-piece wave inner channel according to another embodiment.

Referring to FIG. 14, a two-piece wave inner channel configuration of a collet 410 according to another embodiment is shown. In this embodiment, two housing segments 450D-E form the tubular collet 410. Bolts 520 may be used to secure the housing segment 450D to the housing segment 450E, thus eliminating the necessity of the crimping process shown in FIGS. 7-9. By varying the tightness of each bolt 520 along the length of the collet 410, a different radial compression force may be applied to the inserted core 105 (not shown). Each of the two housing segments 450D-E may be configured with the angled inner channel configuration shown in FIG. 10. When assembled, the two housing segments 450D-E form the inner channel 445 configured as a wave in two-dimensional space. The amplitude of the wave depends on the angle between midline 470A and midline 470B of the first section 455 and second section 460, respectively (see FIG. 10). The core 105 (not shown) inserted into the wave inner channel configuration is forced to bend in one plane following the wave shape of the inner channel 445. This provides a translational force that opposes the tension force acting to disengage the suspended core 105 (not shown) from the collet 410.

Figure 15:
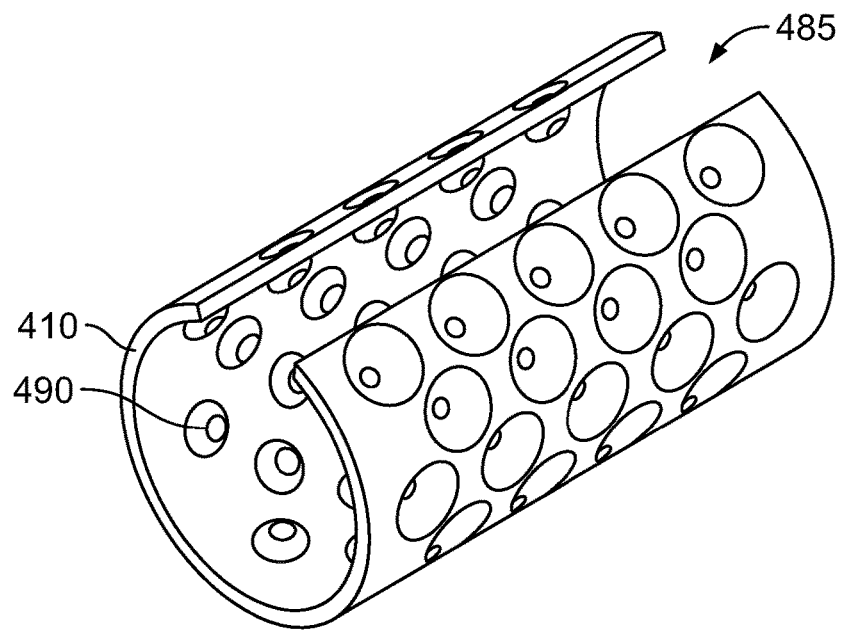
FIG. 15 shows a perspective view of a one-piece dimple collet according to another embodiment.

Referring to FIGS. 15-16, a one-piece dimple inner channel configuration of a collet 410 according to another embodiment is shown. In this embodiment, the collet 410 is formed by a single segment configured as a C-shape. The C-shaped collet 410 includes an opening 485 that allows a larger diameter of the collet 410 such that the corresponding circumference of the collet 410 is larger than the circumference of a core 105 (not shown). This allows easy insertion of the core 105 (not shown) into the inner channel 445 before the crimping process. The crimping process (see FIGS. 7-8) will close the opening 485 and decrease the diameter and corresponding circumference of the collet 410, thus forming a mechanical connection between the collet 410 and the inserted core 105 (not shown). A plurality of dimples 490 line the inner surface area of the collet 410 and are configured to engage the surface of the inserted core 105 (not shown) after crimping. Depending on the curvature of the C-shaped collet 410, each dimple 490 will form an angle 495 with respect to its adjacent dimples 490 along the circumference of the collet 410. Uniform spacing of the dimples 490 along the circumference of the collet 410 is accomplished when the angle 495 between dimples 490 is congruent. The specific angle 495 formed between various dimples 490 may vary in different embodiments and not exhaustively disclosed herein.

Referring to FIG. 17, each individual dimple 490 is coupled to the inner surface of the collet 410 and has a depth 500 and a width 505. When engaging with an inserted core 105 (not shown) after crimping, the depth 500 of the dimple 490 provides a translational friction force against the tension force acting to disengage the suspended core 105 (not shown) from the crimped collet 410. The dimple 490 also exerts a radial compression force on the core 105 (not shown) that is less than the compression strength tolerable by the core 105 (not shown). By increasing the width 505 of the dimple 490 in relation to its depth 500, the radial compression force exerted by the dimple 490 on the engaging core 105 (not shown) may be distributed across a larger surface area, thus decreasing the possibility of compression damage to the core 105 (not shown). Varying the depth 500 to width 505 ratio of the dimple 490 allows the C-shaped collet 410 to possess different translational friction parameters. It would be understood by those skilled in the art that various depths 500, widths 505, and depth 500 to width 505 ratios of the dimple 490 may be possible in different embodiments not exhaustively described herein and do not deviate from the teachings of the present application.

Dimples 490 may be spaced on the inner surface area of the collet 410 according to a variety of configurations. FIG. 18 shows one such placement configuration wherein the plurality of dimples 490 are uniformly spaced in a repeated diamond configuration 515 on the inner surface of the collet 410. This uniform placement allows for uniformly distributed compression force and translational friction force exerted by the dimples 490 on the inserted and engaged core 105 (not shown). It would be appreciated by those skilled in the art that other placement configurations of the plurality of dimples 490 on the collet 410 may be possible in different embodiments not exhaustively described herein and do not deviate from the teachings of the present application.

Any combination of the misaligned, angled, spiral/helix, wave, and/or dimple inner channel configurations as disclosed above may be adopted in the collet 410 to oppose the tension force acting on an inserted and suspended core 105 (not shown). Furthermore, the methods (i.e., bolting or crimping) used to form the mechanical connection between the core 105 (not shown) and the collet 410 need not necessarily be assigned to any possible combination of configurations. The collet 410 may be divided into a number of housing segments not necessarily limited to one-piece, two-piece, and three-piece to achieve essentially the same results.

All combinations of embodiments and variations of design are not exhaustively described in detail herein. Said combinations and variations are understood by those skilled in the art as not deviating from the teachings of the present application.

What is claimed is:

1. An electrical connector assembly configured to increase a mechanical hold on a core, the electrical connector assembly comprising:
   a connector member;
   a plurality of housing segments forming a collet having a tubular shape, each of the plurality of housing segments having an inner surface and an outer surface, wherein the inner surfaces of the plurality of housing segments form an inner channel of the collet;
   a sleeve having a tubular shape configured to slidably encase the outer surfaces of the plurality of housing segments in the collet,
   wherein the inner channel is configured to receive the core,
   wherein the inner channel includes a first section and a second section, and
   wherein a midline of the first section is not collinear with a midline of the second section.

2. The electrical connector assembly according to claim 1, wherein the connector member includes a first end and a second end, the first end being configured to connect the connector member to another transmission element, and the second end being configured to connect to the collet.

3. The electrical connector assembly according to claim 1, wherein the connector member further includes a ridge section.

4. The electrical connector assembly according to claim 3, wherein the ridge section is slidably inserted and crimped into the sleeve to form a mechanical and electrical connection between the sleeve and the connector member.

5. The electrical connector assembly according to claim 1, wherein the midline of the first section being not collinear with a midline of the second section provides a translational resistive force against an opposing tension force acting to disengage the core from the inner channel.

6. The electrical connector assembly according to claim 1, wherein the core is an aluminum conductor composite core.

7. An electrical connector assembly configured to increase a mechanical hold on a core, the electrical connector assembly comprising:
a connector member;
a plurality of housing segments forming a collet having a tubular shape, each of the plurality of housing segments having an inner surface and an outer surface, wherein the inner surfaces of the plurality of housing segments form an inner channel of the collet;
a sleeve having a tubular shape configured to slidably encase the outer surfaces of the plurality of housing segments in the collet,
wherein the inner channel is configured to receive the core, and
wherein the inner channel includes a plurality of first sections and a plurality of second sections, and
wherein a midline of the plurality of first sections is offset from a midline of the plurality of second sections.

8. The electrical connector assembly according to claim 7, wherein the connector member includes a first end and a second end, the first end being configured to connect the connector member to another transmission element, and the second end being configured to connect to the collet.

9. The electrical connector assembly according to claim 7, wherein the connector member further includes a ridge section.

10. The electrical connector assembly according to claim 9, wherein the ridge section is slidably inserted and crimped into the sleeve to form a mechanical and electrical connection between the sleeve and the connector member.

11. The electrical connector assembly according to claim 7, wherein the midline of the plurality of first sections being offset from a midline of the plurality of second sections provides a translational resistive force against an opposing tension force acting to disengage the core from the inner channel.

12. The electrical connector assembly according to claim 7, wherein the core is an aluminum conductor composite core.

13. An electrical connector assembly configured to increase a mechanical hold on a core, the electrical connector assembly comprising:
a connector member;
three housing segments forming a collet having a tubular shape, each of the three housing segments having an inner surface and an outer surface, wherein the inner surface of each housing segment includes a recessed channel, and wherein the recessed channels of the three housing segments form an inner channel of the collet;
a sleeve having a tubular shape configured to slidably encase the outer surfaces of the three housing segments in the collet,
wherein the inner channel is configured to receive the core, and
wherein the recessed channel of each of the three housing segments is twisted about a circumference of the core to form a spiral helix in the inner channel.

14. The electrical connector assembly according to claim 13, wherein the recessed channel of each housing segment is spaced equidistantly around a circumference of the inner channel.

15. The electrical connector assembly according to claim 13, wherein the connector member includes a first end and a second end, the first end being configured to connect the connector member to another transmission element, and the second end being configured to connect to the collet.

16. The electrical connector assembly according to claim 13, wherein the connector member further includes a ridge section.

17. The electrical connector assembly according to claim 16, wherein the ridge section is slidably inserted and crimped into the sleeve to form a mechanical and electrical connection between the sleeve and the connector member.

18. The electrical connector assembly according to claim 13, wherein the spiral helix in the inner channel of the collet bends the inserted core in a cork screw shape that provides a translational resistive force against an opposing tension force acting to disengage the core from the inner channel.

19. The electrical connector assembly according to claim 13, wherein the core is an aluminum conductor composite core.

20. An electrical connector assembly configured to increase a mechanical hold on a core, the electrical connector assembly comprising:
a connector member;
a plurality of housing segments forming a collet having a tubular shape, each of the plurality of housing segments having an inner surface and an outer surface, wherein the inner surfaces of the plurality of housing segments form an inner channel of the collet;
a sleeve having a tubular shape configured to slidably encase the outer surfaces of the plurality of housing segments in the collet,
wherein the inner channel is configured to receive the core, and
wherein the inner surface of at least one of the plurality of housing segments includes a plurality of dimples spaced at radial intervals around a circumference of the inner surface to form a diamond configuration.

21. The electrical connector assembly according to claim 20, wherein the plurality of dimples are arranged in an array.

22. The electrical connector assembly according to claim 20, wherein the connector member includes a first end and a second end, the first end being configured to connect the connector member to another transmission element, and the second end being configured to connect to the collet.

23. The electrical connector assembly according to claim 20, wherein the connector member further includes a ridge section.

24. The electrical connector assembly according to claim 23, wherein the ridge section is slidably inserted and crimped into the sleeve to form a mechanical and electrical connection between the sleeve and the connector member.

25. The electrical connector assembly according to claim 20, wherein the plurality of dimples in the inner channel of the collet provides a translational resistive force against an opposing tension force acting to disengage the core from the inner channel.

26. The electrical connector assembly according to claim 20, wherein the core is an aluminum conductor composite core.

* * * * *